US008162666B2

(12) United States Patent
Parham

(10) Patent No.: US 8,162,666 B2
(45) Date of Patent: Apr. 24, 2012

(54) MULTI-PLAYER SECONDARY GAMING METHOD AND SYSTEM

(76) Inventor: Tyler Parham, Reno, NV (US)

( * ) Notice: Subject to any disclaimer, the term of this patent is extended or adjusted under 35 U.S.C. 154(b) by 1111 days.

(21) Appl. No.: 10/712,628

(22) Filed: Nov. 12, 2003

(65) Prior Publication Data

US 2005/0101384 A1 May 12, 2005

Related U.S. Application Data

(60) Provisional application No. 60/424,814, filed on Nov. 12, 2002.

(51) Int. Cl.
*G06F 19/00* (2006.01)
*A63F 13/00* (2006.01)

(52) U.S. Cl. ................ 434/42; 434/16; 434/17; 434/18; 434/19; 434/20; 434/26; 434/27

(58) Field of Classification Search .............. 463/16–20, 463/26–27, 42
See application file for complete search history.

(56) References Cited

U.S. PATENT DOCUMENTS

| | | | | |
|---|---|---|---|---|
| 5,580,309 | A | 12/1996 | Piechowiak et al. | |
| 5,779,544 | A * | 7/1998 | Seelig et al. | 463/6 |
| 5,876,284 | A * | 3/1999 | Acres et al. | 463/25 |
| 5,980,384 | A * | 11/1999 | Barrie | 463/16 |
| 6,033,307 | A * | 3/2000 | Vancura | 463/20 |
| 6,068,553 | A | 5/2000 | Parker | |
| 6,089,976 | A * | 7/2000 | Schneider et al. | 463/16 |
| 6,126,542 | A * | 10/2000 | Fier | 463/16 |
| 6,142,872 | A | 11/2000 | Walker et al. | |
| 6,146,273 | A * | 11/2000 | Olsen | 463/27 |
| 6,190,255 | B1 * | 2/2001 | Thomas et al. | 463/20 |
| 6,206,782 | B1 | 3/2001 | Walker et al. | |
| 6,231,445 | B1 * | 5/2001 | Acres | 463/42 |
| 6,238,288 | B1 | 5/2001 | Walker et al. | |
| 6,309,300 | B1 * | 10/2001 | Glavich | 463/26 |
| 6,312,332 | B1 * | 11/2001 | Walker et al. | 463/23 |
| 6,319,122 | B1 * | 11/2001 | Packes et al. | 463/16 |
| 6,322,309 | B1 * | 11/2001 | Thomas et al. | 413/20 |
| 6,358,149 | B1 * | 3/2002 | Schneider et al. | 463/27 |
| 6,361,441 | B1 | 3/2002 | Walker et al. | |
| 6,364,765 | B1 * | 4/2002 | Walker et al. | 463/16 |
| 6,364,768 | B1 * | 4/2002 | Acres et al. | 463/25 |
| 6,375,567 | B1 * | 4/2002 | Acres | 463/25 |
| 6,416,408 | B2 | 7/2002 | Tracy et al. | |
| 6,464,584 | B2 * | 10/2002 | Oliver | 463/25 |
| 6,503,146 | B2 | 1/2003 | Walker et al. | |
| 6,565,436 | B1 * | 5/2003 | Baerlocher | 463/26 |
| 6,648,753 | B1 * | 11/2003 | Tracy et al. | 463/16 |
| 6,652,378 | B2 * | 11/2003 | Cannon et al. | 463/20 |
| 6,692,353 | B2 * | 2/2004 | Walker et al. | 463/16 |

(Continued)

*Primary Examiner* — Xuan Thai
*Assistant Examiner* — Alvin Carlos
(74) *Attorney, Agent, or Firm* — Nwamu, P.C.; Fidel D. Nwamu

(57) ABSTRACT

In accordance with the present invention, multiple networked gaming devices can participate in a secondary type game. A primary game such as poker, rotatable wheels, wheel of fortune or the like is initiated on a gaming device. A predetermined outcome (for example) of the primary game is then used to qualify the gaming device for a secondary type game. A predetermined outcome might be a wheel of fortune SPIN symbol, for example. Once the gaming device is qualified, a secondary game indication cycle is triggered. During this cycle, additional gaming devices can then qualify for the secondary type game by using one or more predetermined primary game outcomes, for example. The secondary type game is then initiated and a secondary game payout awarded to the gaming devices.

53 Claims, 2 Drawing Sheets

U.S. PATENT DOCUMENTS

| | | | | |
|---|---|---|---|---|
| 6,692,354 | B2 | 2/2004 | Tracy et al. | |
| 6,712,699 | B2 * | 3/2004 | Walker et al. | 463/30 |
| 6,733,390 | B2 * | 5/2004 | Walker et al. | 463/23 |
| 6,743,096 | B2 * | 6/2004 | Allendorf et al. | 463/25 |
| 6,832,958 | B2 | 12/2004 | Acres et al. | |
| 6,843,724 | B2 * | 1/2005 | Walker et al. | 463/25 |
| 6,887,154 | B1 * | 5/2005 | Luciano et al. | 463/26 |
| 6,984,174 | B2 * | 1/2006 | Cannon et al. | 463/25 |
| 7,008,319 | B2 | 3/2006 | Montgomery et al. | |
| 7,048,628 | B2 * | 5/2006 | Schneider | 463/16 |
| 7,297,059 | B2 * | 11/2007 | Vancura et al. | 463/27 |
| 7,300,351 | B2 * | 11/2007 | Thomas | 463/20 |
| 7,416,484 | B1 * | 8/2008 | Nelson et al. | 463/25 |
| 2002/0142844 | A1 * | 10/2002 | Kerr | 463/42 |
| 2002/0160826 | A1 * | 10/2002 | Gomez et al. | 463/16 |
| 2003/0064768 | A1 * | 4/2003 | Fier | 463/13 |
| 2003/0069058 | A1 | 4/2003 | Byrne | |
| 2003/0078091 | A1 * | 4/2003 | Brandstetter et al. | 463/20 |
| 2003/0078101 | A1 * | 4/2003 | Schneider et al. | 463/42 |
| 2003/0100361 | A1 * | 5/2003 | Sharpless et al. | 463/25 |
| 2003/0119581 | A1 * | 6/2003 | Cannon et al. | 463/25 |
| 2003/0190941 | A1 | 10/2003 | Byrne | |
| 2003/0199306 | A1 | 10/2003 | Parker | |
| 2003/0199308 | A1 | 10/2003 | Parker | |
| 2004/0053664 | A1 | 3/2004 | Byrne | |
| 2004/0053681 | A1 * | 3/2004 | Jordan et al. | 463/20 |
| 2004/0242320 | A1 * | 12/2004 | Jackson | 463/26 |
| 2006/0046821 | A1 | 3/2006 | Kaminkow et al. | |
| 2006/0046822 | A1 | 3/2006 | Kaminkow et al. | |
| 2006/0046823 | A1 | 3/2006 | Kaminkow et al. | |
| 2006/0084499 | A1 | 4/2006 | Moshal | |
| 2006/0211472 | A1 | 9/2006 | Walker et al. | |
| 2007/0015584 | A1 | 1/2007 | Frenkel | |

* cited by examiner

MULTI-PLAYER SECONDARY GAMING METHOD AND SYSTEM

CLAIM OF PRIORITY

The present application claims priority from U.S. Provisional Patent Application Ser. No. 60/424,814, entitled "Multi-player Value Wheel Game Method and Apparatus," filed on Nov. 12, 2002.

BACKGROUND OF THE INVENTION

The present invention is related generally to gaming systems and more particularly to gaming systems and methods allowing secondary gaming for multiple players.

Gaming systems continue to become popular among casino gaming players. In part, this is attributable to the ever-increasing game varieties available on the market. Players appreciate new game varieties they have never played particularly when "gaming" is involved. Here, the term "gaming," "gaming devices," "gaming systems," indicates that wagering or a wagering variant is involved so players can bet money or currency equivalents (e.g., token, credit, etc.) to win more money.

Slot machines are examples of gaming systems that remain popular among gaming enthusiasts. A slot machine can receive money (or other value items) from a player for a chance to win more money. After the wager amount is deposited into the slot machine, the player spins the slot machine reels to display a random combination of indicia, such as numbers or symbols. If a pre-selected winning combination of indicia is displayed, the machine releases money into a payout chute or onto a credit meter for collection by the player. Returns can vary depending upon the initial wager amount. For example, if a player initially wagered two coins and that player won a high payout, that player may receive fifty coins of the same denomination in return.

Another popular game of chance is the wheel of fortune. It typically includes a rotating disk or wheel having numbers, symbols or other indicia on the wheel's face. A stationary pointer, such as a flexible resilient flipper, can point to the winning numbers when the wheel becomes stationary (after spinning).

A number of games incorporparation a wheel of fortune have been devised, including a televised game tilted "Wheel of Fortune" which combines a spin of a wheel of fortune with players' attempts to complete and/or guess at a hidden phase by choosing, winning or buying letters of the alphabet which are revealed to the players if contained in the hidden phase.

Those familiar with gaming and game shows will appreciate that players and observers typically experience a heightened level of anticipation and excitement as they observers one of more moving objects approaching a winning position.

Although not a game by itself, another popular game type is the "bonus feature" used in conjunction with existing games. Because the development of diversions and new games is costly and time consuming without certainty as to whether the game will be accepted by the gaming public, use of bonus features on established and accepted games is becoming popular. For example, one U.S. patent discloses a bonus feature, wherein a player may qualify for a bonus game on a gaming machine after achieving a predetermined winning outcome. Since this bonus feature is only available to those players who achieve the predetermined winning outcome, other players can become bored and are likely to cease playing the game. There is, therefore, a need to provide bonus games in which a bonus or winning outcome creates a socially exhilarating group win environment around the game.

Regardless of the game being played or the venue in which it is presented for wagering, there is a need for new gaming methods that will attract new entrant to wagering games. Moreover existing games need to hold the attention of existing entrants and spectators so that such games remain attractive relative to the many new game types and diversions constantly being developed.

SUMMARY OF THE INVENTION

Various aspects of the present invention comprise can be found in a multi-player secondary system and method. According to a first aspect, a method for enabling multiple networked gaming devices to participate in a secondary game is disclosed. In according with this method, a gaming device is provided by wich a player can initiate a primary game. The primary game may be poker, video slot, and traditional slot such as rotatable reels, wheel of fortune or the like. The gaming device is qualified to participate in a secondary game by using a predetermined primary game outcome or indicia, such as a SPIN symbol on the popular wheel of fortune game.

Once the gaming device is qualified, a secondary game indication cycle is triggered for a predetermined duration, for example, after qualification of the gaming device. However, the duration of the secondary game indication cycle can be determined by other events. As another example, duration of the secondary game indication cycle can be determined by a predetermined number of primary game plays, or even a predetermined number of predetermined primary game play outcomes. Thereafter, additional gaming devices are qualified to participate in the secondary game by using predetermined primary game outcomes during the secondary game indication cycle. For each additional gaming device that is qualified, the secondary game payout award is increased by a value. Thereafter, the secondary game is initiated and the selected secondary game payout award is awarded to every gaming device qualified to participate in the secondary game.

More specifically, once a player bets the proper wager and initiates a primary game play on any participating gaming device connected to a network, the player becomes eligible to win payout awards and to increase such payout awards. The payout awards can be displayed as indicia (e.g. $10.00, $20.00, $30.00, $40.00) on secondary game display. The secondary game display may be separate or the same as the primary game display. The primary game player qualifies for the secondary game when a predetermined primary game outcome (e.g., a $ indicia) is randomly received. When the player and other players playing eligible gaming devices receive another predetermined primary game outcome, they are provided with an opportunity (for a random or predetermined number of game plays, time frames, or any combination of, etc) to increase and win a prize award in the secondary game.

As additional predetermined primary game outcome are received during primary game play, the value of the prize awards displayed are increased. Once the predetermined number of game plays and/or time frame runs out for each player playing a primary gaming device, prize award amounts are displayed for the secondary game. And, during the secondary game, at least one displayed prize award is randomly selected and awarded to all of the participating gaming devices connected to the network.

According to another embodiment of the present invention, before or after primary game play of an eligible gaming device, players can select a predetermined primary or secondary game outcome that they believe will be the next primary or secondary game outcome.

When the next predetermined primary game and/or secondary game outcome is determined, if the player(s) selection is the same, the player wins at least one prize that has been determined by the wager placed and the predetermined odds associated with the selected predetermined primary game and/or secondary game outcome. If the next predetermined primary game and/or secondary game outcome achieved is not the same as at least one of the predetermined primary game and/or secondary game outcomes selected by the player, the play is terminated. An advantage of the present invention is the provision of a simple game enhancement that can be used in combination with existing games to generate and sustain player interest by offering a socially exhilarating group win environment around multiple games.

A further understanding of the nature and advantages of the present invention herein may be realized by reference to the remaining portions of the specification and the attached drawings. References to "steps" of the present invention should not be construed as limited to "step plus function" means, and are not intended to refer to a specific order for implementing the invention. Further features and advantages of the present invention, as well as the structure and operation of various embodiments of the present invention, are described in detail below with respect to the accompanying drawings. In the drawings, the same reference numbers indicate identical or functionally similar elements.

DETAILED DESCRIPTION OF THE DRAWINGS

Figure 1:
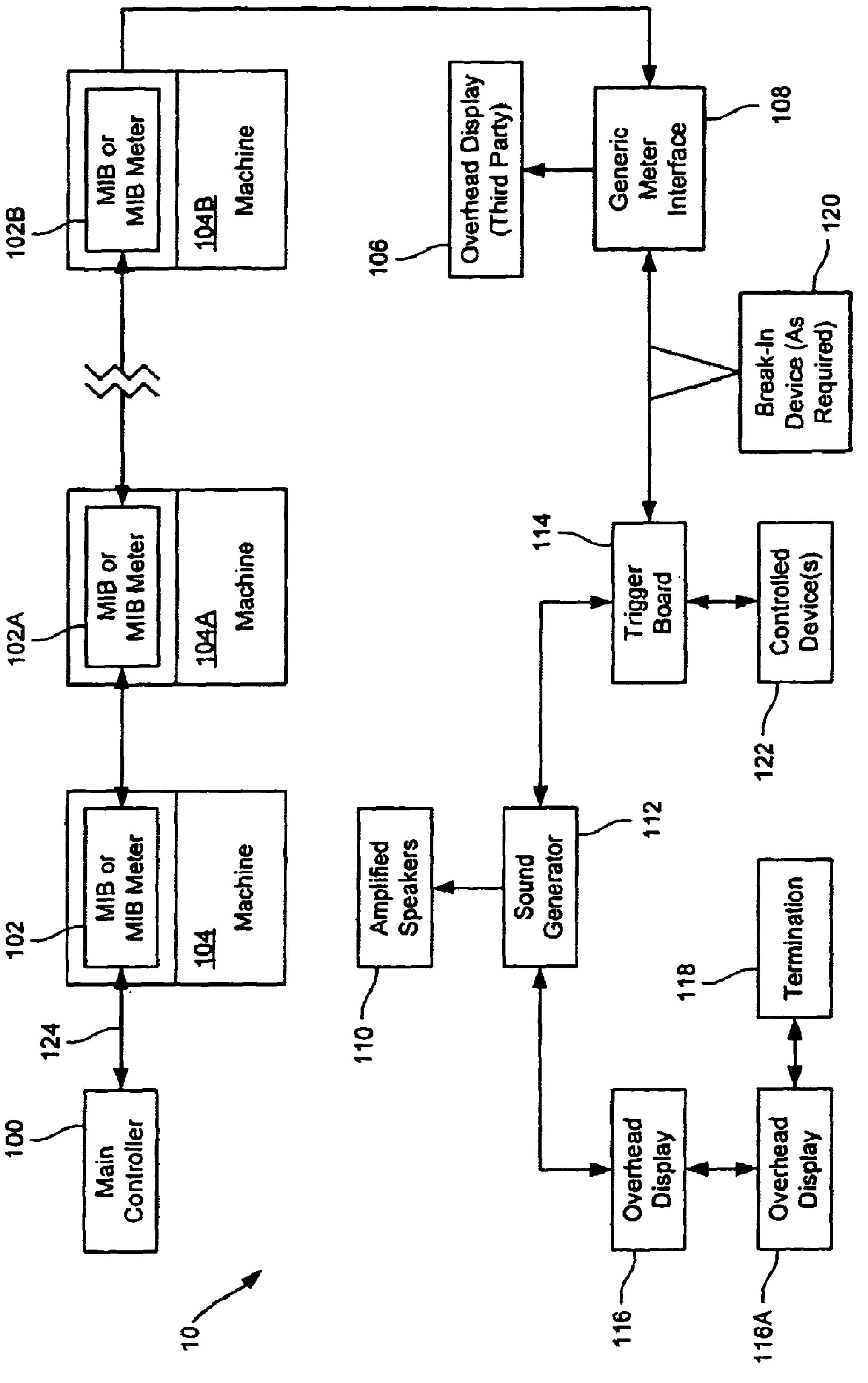
FIG. 1 (Prior Art)
FIG. 1 is a block diagram of a conventional gaming system for awarding payouts and prizes, the system being modifiable as proves necessary for implementing the various embodiments of the present invention.

FIG. 1 is a block diagram of a conventional gaming system 10 for awarding payouts and prizes. Among other components, gaming system 10 comprises a programmable controller 100 and one or more gaming devices 104, 104A, 104B. Gaming system 10 further comprises programmable Machine Interface Boards 102, 102A, 102B; overhead displays 116, 116A or an existing display 106 with a generic display interface 108; an optional sound units 112; trigger board units 114; and one or more "break in" devices 120 for system programming (on a casino floor, for example). Gaming system 10 may be utilized for implementing the present invention with various modifications as proves necessary to implement the invention.

The present invention maybe implemented as part of any novel programmable electronic or computer-controlled gaming devices that offer a game payout that can be used in conjunction with a typical networked gaming system. The novel gaming device preferably has various output devices, which may include a display screen for displaying aspects of the invention as described more thoroughly below. Other output devices may include audio outputs such as speakers, bells, whistles and the like, and signaling devices such as controllable lights and the like.

A number of types of input devices can be used by which the user can place wagers and/or play the game, including touch screen input devices, joysticks, mouse input devices, keyboards, buttons, levers and the like, as well as coin or currency acceptors and/or validators, card readers such as credit card readers, or other encoded-card readers. Also, gaming terminals may be provided with communication devices, e.g., for purposes for accounting, maintenance, management, security, controls, updating and the like.

In an alternate embodiment, the invention is implemented on one or more existing electronic or computer-controlled gaming devices. One or more gaming devices 104, 104A are coupled to a programmable controller 100 over a communication network 124, which could be any suitable serial or parallel bus arrangement. Indeed, any communication link 124 could be utilized under the method of the present invention and a programmable (controller) 100 could be located remotely from or within the gaming devices 104, 104A. At each gaming device 104 there may be a programmable machine interface board 102 that interfaces between the conventional electronic circuitry of gaming device 104 and the communication network 124.

With a need for no more than relatively minor modifications, any conventional electronic or computer-controlled gaming devices e.g. video games, spinning reel slot games, keno games, live card games with tables interfacing with electronic equipment, Internet and/or networked games, etc. that receives bets in order to play a game at the machine is contemplated to be used, under the methods of the present invention. The design and operation of gaming devices is well known and conventional gaming machines are available such as from International Gaming Technology™ and Bally™. Modifications to previous gaming devices for use in accordance with embodiments of the present invention can include, e.g., providing graphics, instructions, harnessing, prize indications and the like to inform players how to play the game, meter displays, etc. Furthermore, the controller 100 can be any suitable computer-based controller.

The controller 100 used can be any of a number of different controllers and computer based processing systems. How the controller 100 communicates with each gaming machine 104 over the communication network 124 is a matter of design choice and the protocols of communication are determined by the nature of the communication network 124 and the corresponding interface circuits.

The controller 100 may optionally be connected over communication link 124 to another computer system, not shown. Furthermore, the network 124 in some embodiments is a telecommunications network such as a phone link, intranet, Internet, satellite, etc. In these embodiments, the gaming devices are implemented as game software in personal computers which are located in remote locations such as hotel/motel rooms, homes, etc.

In an embodiment of the present invention, once a player bets the proper wager and initiates a primary game play on any participating gaming device 104, 104A, 104B connected to a communication network 124, the player becomes eligible to win and increase e.g., (multiplied 1×, 2×, 3× or through other traditional means that are well known in the art) at least one discernible indicia e.g., (fixed or progressive prize award e.g. $10.00, $20.00, $30.00, $40.00) displayed 116 in a secondary game. Any conventional eligibility requirements such as rate of play, wager, max wager, insertion of player cards, one or more predetermined indicia, separate wager bet, etc.

Any traditional means of displaying 116 discernible indicia for a secondary game or any combination of maybe utilized under the method of the present invention which will be appreciated by those skilled in the art, such as on gaming device 104 and/or on the video screen (not shown) of gaming device 104 and/or showcased on a display 116 or 106 above the individual gaming device 104 or a group of gaming devices 104.

When a player playing an eligible gaming device 104 receives a predetermined primary game outcome, the player and other players playing eligible gaming devices 104, 104A, 104B are provided with at least one opportunity (for a random or predetermined number of game plays, a predetermined number of predetermined primary game play outcomes, time frames, etc., or any combination thereof) to win and increase by 1× at least one prize award displayed 116 in a secondary game by receiving another predetermined primary game outcome through primary game play.

Whenever another predetermined primary game outcome is received during primary game play on at least one eligible gaming device 104A during the predetermined number of game plays, values of the prize awards displayed 116 are increased 2× e.g., $20.00, $40.00, $60.00, $80.00. Once the predetermined number of game plays runs out for each player playing the eligible gaming devices 104, 104A, 104B, at least one of the prize award amounts displayed 116 that has been multiplied e.g., 20.00, $40.00, $60.00, or $80.00 is then randomly selected e.g., $60.00 in the secondary game and awarded to all of the participating gaming devices connected to the network that received at least one predetermined primary game outcome (e.g., $60 to 104A, 104B and 104C).

According to another embodiment of the present invention, before or after primary game play of an eligible gaming device 104, the player is provided with an opportunity to wager on and select (through traditional means) at least one predetermined primary game and/or secondary game outcome that the player believes will be the next predetermined primary game and/or secondary game outcome from at least one gaming device 104, 104A, 104B connected to the communication network 124. When the next predetermined primary game and/or secondary game outcome is determined, if the player's selection is the same, the player wins at least one prize that has been determined by the wager placed and the predetermined odds associated with the selected predetermined primary game and/or secondary game outcome. If the next predetermined primary game and/or secondary game outcome achieved is not the same as at least one of the predetermined primary game and/or secondary game outcomes selected by the player, the player loses.

In an embodiment of the present invention, all the gaming devices 104, 104A, 104B connected to the network 124 have the same primary game e.g., Jacks or Better Poker. The player can select from e.g., (FOUR OF A KIND pays 10 to 1, FULL HOUSE pays 5 to 1, FLUSH pays 4 to 1, STRAIGHT pays 4 to 1 and THREE OF A KIND pays 2 to 1) as the next predetermined primary game outcome. Other game outcomes in this embodiment are not used in this example but maybe used in other embodiments. The player on gaming device 104 wagers $1.00 and selects a FLUSH as the next predetermined primary game outcome. The next predetermined primary game outcome is THREE OF A KIND on gaming device 104A and the player loses.

Figure 2:
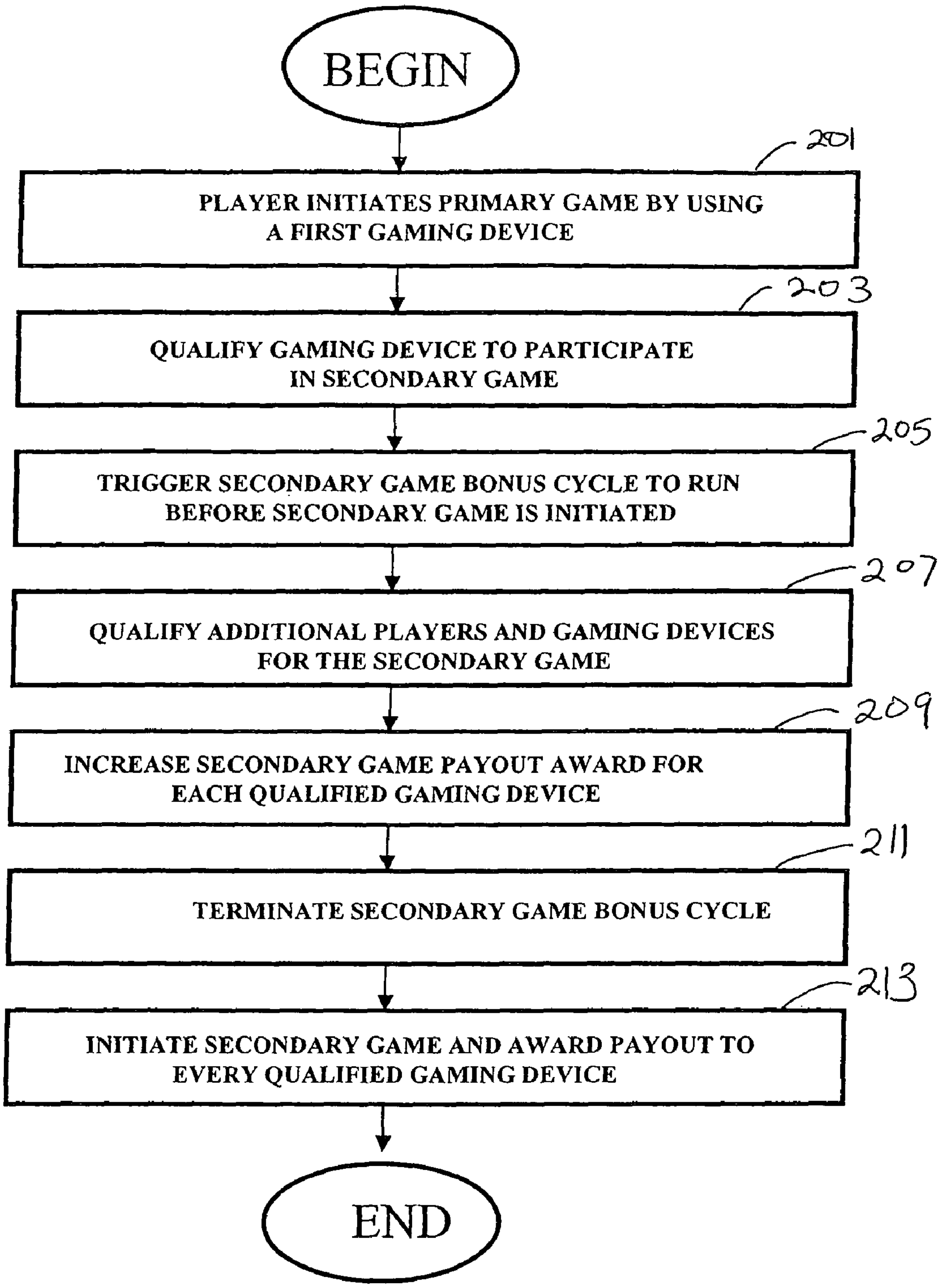
FIG. 2 is a flow chart of a method for using the present invention in accordance with an embodiment of the present invention.

FIG. 2 is a flow chart of a method for using the present invention in accordance with an embodiment of the present invention.

Briefly, the method employs gaming system 10, described above, which is a gaming network having a plurality of gaming devices 104, 104A, 104B. By using such gaming devices, multiple players can become involved in a secondary type game to increase play excitement and appeal. The method includes a number of steps, namely, initiating a primary type game by using gaming device 104, and then using this device to qualify for participation in a secondary type game. When gaming device 104 is qualified for the secondary type game, a secondary game indication cycle is triggered to run before the secondary type game is initiated. Note that, in one embodiment, the secondary game indication cycle is capable of running for a predetermined duration. During the predetermined duration of the secondary game indication cycle, additional gaming devices are qualified to participate in the secondary type game. Further, for each qualified gaming device, the payout award for the secondary type game is increased by a value. Upon conclusion of the secondary game indication cycle, the secondary type game begins and is played by every gaming device previously qualified to participate in the secondary type game. Thereafter, payout awards are then awarded to all qualified gaming devices.

In more detail, at block 201, the method of the present invention begins when a player uses gaming device 104 to initiate a primary type game. A primary type game is an initial or main game, such as the main game of wheel of fortune. The primary game can be initiated by inserting a wager amount into a currency acceptor, or may be triggered by an event, such as, occurrence of a designated time, for example, or other predetermined indicia.

Next, at block 203, gaming device 104 is qualified to participate in a secondary type game. As implied by its name, the secondary type game is a game subsequent to the primary game. Secondary games provide additional entertainment value to create player appeal, raise coin-in, and increase playing time on casino gaming devices, for example. A subsequent wheel of fortune game is an example of a secondary type game.

Gaming device 104 can become qualified for the secondary game by randomly receiving a predetermined primary game outcome or indicia. For example, in a primary type wheel of fortune game, gaming device 104 becomes qualified when the predetermined indicia (e.g. a SPIN symbol on the wheel) comes to rest at the wheel pointer. Alternatively, gaming device 104 can become qualified by placing a maximum bet wager.

At block 205, a secondary game indication cycle is triggered to run before the secondary type game is initiated. It is during this secondary game indication cycle that additional players can become eligible for the secondary type game play (block 207). Herein lies one advantage of the present invention. Within the available window of the secondary game indication cycle, other gaming devices 104A, 104B can qualify to play the secondary type game in order to increase the number of players, which creates more excitement compared to having a solo player participating individually in the secondary type game. Qualifying the players within the secondary game indication cycle further creates a "rush" in which players become excited knowing that a limited opportunity to continue game play has been presented.

Once the available window of opportunity created by the secondary game indication cycle is gone (block 211), additional players can no longer be added. Such window of opportunity may be such that the secondary game indication cycle is capable of running only for a predetermined duration. For example, the secondary game indication cycle can be set to run only for 30 seconds, after which additional players can no longer be added. Within those 30 seconds, other gaming devices 104A, 104B can qualify by "hitting" or receiving a predetermined primary game outcome or indicia, similar to the manner in which gaming device 104 qualified for the secondary type game. In fact, even gaming device 104 (and other gaming devices) can qualify, as many times as possible, for additional secondary bonus games during the pendency of the secondary game indication cycle. In an alternate embodiment, the secondary game indication cycle pendency is determined by a designated number of primary plays (e.g. 3 plays), after gaming device 104 is initially qualified for the secondary type game. For example, in the case of wheel of fortune, the secondary game indication cycle can be terminated after the wheel has been spun for 3 additional times following the initial qualification of gaming device 104 for the secondary type game.

At block 209, for each additional gaming device that is qualified for the secondary game, the payout award for the secondary game is increased by a multiple value. For example, if gaming device 104 qualifies for 2 secondary type games, the payout award is increased by 2×. If gaming device 104B further qualifies for 3 secondary type games, then the payout award is increased by 3× for a total of 5×. Herein lies a further advantage of the present invention. Unlike the prior art, the present invention not only allows multiple gaming devices to participate in a secondary type game within a secondary game indication cycle duration, it further permits the payout awards to be increased for each qualified player or gaming device. In this manner, player excitement and appeal continue to remain at significantly high levels.

At block 211, the secondary game indication cycle is terminated. As discussed, the above process of qualifying and multiplying the payout award continues until the secondary game indication cycle is terminated.

At block 213, upon conclusion of the secondary game indication cycle, the secondary type game is initiated and the payout award is awarded to every gaming device qualified to participate in the secondary type game. This is another novel aspect of the present invention hereto not seen in the prior art. All qualified players or gaming devices are awarded a payout amount determined by the total number of qualifications for the secondary game. For example, assuming that the payout award has reached a 5× multiple, all players receive five times (or other randomly selected) the original payout award upon conclusion of the secondary type game.

While the above is a complete description of exemplary specific embodiments of the invention, additional embodiments are also possible. Thus, the above description should not be taken as limiting the scope of the invention, which is defined by the appended claims along with their full scope of equivalents.

What is claimed is:

1. A method for enabling multiple networked gaming devices to participate in a secondary game, the method comprising:
- providing a first gaming device for initiating a primary game;
- qualifying the first gaming device to participate in a secondary game by using a predetermined primary game outcome;
- qualifying additional gaming devices to participate in the secondary game by using predetermined primary game outcomes,
- wherein the additional gaming devices are qualified during a designated duration after said first gaming device is qualified or during a predetermined number of primary game plays after qualification of said first gaming device;
- for each additional gaming device that is qualified, increasing a payout award of the secondary game by a value; and
- initiating the secondary game and awarding, to every gaming device qualified to participate in the secondary game, the payout award of the secondary game.

2. In a gaming network having a plurality of gaming devices, a method of involving multiple players and their gaming devices in a secondary type game, the method comprising:
- initiating a primary type game by using a first gaming device;
- qualifying the first gaming device to participate in a secondary type game;
- triggering a secondary game indication cycle to run before the secondary type game is initiated, wherein said secondary game indication cycle is capable of running for a predetermined duration;
- qualifying, during said predetermined duration of said secondary game indication cycle, additional gaming devices to participate in the secondary type game; and
- upon conclusion of said secondary game indication cycle, initiating the secondary type game; and
- awarding, to every gaming device qualified to participate in the secondary type game, one or more payout awards.

3. The method of claim 2 wherein after each additional gaming device is qualified, the method further comprises increasing the secondary payout award by a designated multiple.

4. A method for enabling multiple networked gaming devices to participate in a secondary game, the method comprising:
- providing a first gaming device that qualifies for a secondary game;
- providing a secondary game indication cycle indicative that the first gaming device has qualified for the secondary game;
- qualifying additional gaming devices to participate in the secondary game before expiration of said secondary game indication cycle; and
- initiating the secondary game and awarding a payout award to all qualified gaming devices including the first gaming device and the additional devices qualified to participate in the secondary game.

5. The method of claim 4 further comprising increasing the payout award for each additional device that qualifies for the secondary game.

6. The method of claim 4 further comprising qualifying the first gaming device additional times to participate in the secondary game during pendency of the secondary game indication cycle.

7. The method of claim 4 wherein the secondary game indication cycle expires after a designated duration.

8. The method of claim 4 wherein the secondary game indication cycle expires after a predetermined number of primary game plays after qualification of the first gaming device.

9. The method of claim 4 wherein the secondary game indication cycle expires after a predetermined number of predetermined primary game outcomes after qualification of the first gaming device.

10. A system for allowing multiple networked gaming device system to participate in a secondary game, the system comprising:
- a first gaming device capable of qualifying for a secondary game;
- a controller for providing a secondary game indication cycle indicative that the first gaming device has qualified for the secondary game; and
- one or more additional gaming devices qualified to participate in the secondary game before expiration of said secondary game indication cycle, wherein said controller increases the secondary game payout award for each qualified gaming device, and wherein the controller initiates the secondary game and awards the secondary game payout award to all qualified gaming devices including the first gaming device and the additional devices qualified to participate in the secondary game.

11. A method for enabling multible-network gaming devices to participate in a secondary game, the method comprising allowing a plurality of players associated with the multiple-network gaming devices to become eligble to qualify to participate in a multiplayer secondary bonus game;

qualifying a first eligible player in the plurality of players to participate in the multiplayer secondary bonus game based upon the first eligible player playing a primary game;

triggering a secondary game indication cycle to run before the multiplayer secondary bonus game is initiated, wherein the secondary game indication cycle is capable of running for a duration;

qualifying, during the duration of the secondary game indication cycle, additional eligible players to participate in the multiplayer secondary bonus game based upon the additional eligible players playing the primary game;

upon conclusion of the secondary game indication cycle, providing the multiplayer secondary bonus game; and awarding, to every eligible player that qualified to participate in the multiplayer secondary bonus game, at least one award.

12. The method of claim 11, wherein awarding comprises:

displaying a plurality of awards;

randomly selecting at least one displayed award; and awarding the at least one displayed award to every eligible player that qualified to participate in the multiplayer secondary bonus game.

13. The method of claim 11, wherein awarding comprises awarding the at least one award to eligible gaming devices associated with every eligible player that qualified to participate in the multiplayer secondary bonus game.

14. The method of claim 11, wherein eligibility for the first player and the additional players is determined based on at least one event and participating in the primary game, wherein eligibility allows the first eligible player and the additional eligible players to qualify for the multiplayer secondary bonus game.

15. The method of claim 14, wherein the at least one event includes a proper wager, a max wager, an insertion of a player card, or a separate wager bet.

16. The method of claim 11, wherein qualifying for the multiplayer secondary bonus game is determined based on the first eligible player or the additional eligible players receiving at least one predetermined indicia in the primary game.

17. The method of claim 11, wherein once the first eligible player is qualified, the secondary game indication cycle is triggered for a predetermined duration.

18. The method of claim 11, wherein once the first eligible player is qualified, the secondary game indication cycle is triggered for a predetermined number of primary game plays.

19. The method of claim 11, wherein the duration includes a predetermined number of primary game plays, a predetermined number of predetermined primary game play outcomes, or a predetermined number of time frames.

20. The method of claim 11, wherein the at least one award is fixed or progressive.

21. The method of claim 11, wherein first eligible player or the additional eligible players are allowed to qualify for the multiplayer secondary bonus game a plurality of times.

22. The method of claim 11, wherein the duration is predetermined or randomly determined.

23. The method of claim 11, further comprising increasing the at least one award of the secondary game by a value for each additional eligible player that is qualified.

24. The method of claim 11, further comprising initiating the primary game using a first gaming device.

25. The method of claim 11, wherein the at least one award comprises at least one randomly selected award.

26. A method for enabling multible-network gaming devices to participate in a secondary game, the method comprising allowing a plurality of players associated with the multiple-network gaming devices to become eligble to qualify to participate in a multiplayer secondary game;

qualifying a first eligible player to be eligible to win an award in the multiplayer secondary bonus game based upon the first eligible player playing the primary game;

triggering a secondary game indication cycle to run before the multiplayer secondary game is initiated, wherein the secondary game indication cycle runs for a duration;

qualifying, during the duration of the secondary game indication cycle, additional eligible players that are eligible to win an award in the multiplayer secondary game based upon the additional eligible players playing the primary game;

upon conclusion of the secondary game indication cycle, initiating the secondary game; and awarding, to each eligible player that qualified to win an award in the secondary game, at least one award.

27. An apparatus comprising:

one or more processors; and logic encoded in one or more tangible media for execution by the one or more processors and when executed operable to:

allow a plurality of players to become eligible to qualify to participate in a multiplayer secondary bonus game;

qualify a first eligible player in the plurality of players to participate in the multiplayer secondary bonus game based upon the first eligible player playing a primary game;

trigger a secondary game indication cycle to run before the multiplayer secondary bonus game is initiated, wherein a secondary game indication cycle is capable of running for a duration;

qualify, during the duration of the secondary game indication cycle, additional eligible players to participate in the multiplayer secondary bonus game based upon the additional eligible players playing the primary game;

upon conclusion of the secondary game indication cycle, provide the multiplayer secondary bonus game; and award, to every eligible player that qualified to participate in the multiplayer secondary bonus game, at least one award.

28. The apparatus of claim 27, wherein logic operable to award further comprises logic operable to:

display a plurality of awards;

randomly select at least one displayed award; and award the at least one displayed award to every eligible player that qualified to participate in the multiplayer secondary bonus game.

29. The apparatus of claim 27, wherein logic operable to award comprises logic operable to award the at least one award to eligible gaming devices associated with every eligible player that qualified to participate in the multiplayer secondary bonus game.

30. The apparatus of claim 27, wherein eligibility for the first player and the additional players is determined based on at least one event and participating in the primary game, wherein eligibility allows the first eligible player and the additional eligible players to qualify for the multiplayer secondary bonus game.

31. The apparatus of claim 30, wherein the at least one event includes a proper wager, a max wager, an insertion of a player card, or a separate wager bet.

32. The apparatus of claim 27, wherein logic operable to qualify for the multiplayer secondary bonus game is determined based on the first eligible player or the additional eligible players receiving at least one predetermined indicia in the primary game.

33. The apparatus of claim 27, wherein once the first eligible player is qualified, the secondary game indication cycle is triggered for a predetermined duration.

34. The apparatus of claim 27, wherein once the first eligible player is qualified, the secondary game indication cycle is triggered for a predetermined number of primary game plays.

35. The apparatus of claim 27, wherein the duration includes a predetermined number of primary game plays, a predetermined number of predetermined primary game play outcomes, or a predetermined number of time frames.

36. The apparatus of claim 27, wherein the at least one award is fixed or progressive.

37. The apparatus of claim 27, wherein first eligible player or the additional eligible players are allowed to qualify for the multiplayer secondary bonus game a plurality of times.

38. The apparatus of claim 27, wherein the duration is predetermined or randomly determined.

39. The apparatus of claim 27, wherein the logic is further operable to increase the at least one award of the secondary game by a value for each additional eligible player that is qualified.

40. The apparatus of claim 27, wherein the logic is further operable to initiate the primary game using a first gaming device.

41. The apparatus of claim 27, wherein the at least one award comprises at least one randomly selected award.

42. An apparatus comprising:

one or more processors; and logic encoded in one or more tangible media for execution by the one or more processors and when executed operable to:

allow a plurality of players to become eligible to qualify to win an award in a multiplayer secondary game;

qualify a first eligible player to be eligible to win an award in the multiplayer secondary bonus game based upon the first eligible player playing the primary game;

trigger a secondary game indication cycle to run before the multiplayer secondary game is initiated, wherein the secondary game indication cycle runs for a duration;

qualify, during the duration of the secondary game indication cycle, additional eligible players that are eligible to win an award in the multiplayer secondary game based upon the additional eligible players playing the primary game;

upon conclusion of the secondary game indication cycle, initiate the secondary game; and award, to each eligible player that qualified to win an award in the secondary game, at least one award.

43. An apparatus for enabling multiple networked gaming devices to participate in a secondary game comprising:

one or more processors; and logic encoded in one or more tangible media for execution by the one or more processors and when executed operable to:

qualify a first gaming device to participate in a secondary game by using a predetermined primary game outcome in a primary game;

qualify additional gaming devices to participate in the secondary game by using predetermined primary game outcomes, wherein the additional gaming devices are qualified during a designated duration after said first gaming device is qualified or during a predetermined number of primary game plays after qualification of said first gaming device;

for each additional gaming device that is qualified, increase a payout award of the secondary game by a value; and initiate the secondary game and award, to every gaming device qualified to participate in the secondary game, the payout award of the secondary game.

44. The apparatus of claim 43, wherein logic operable to increase the payout award comprises logic operable to increase the payout award by a multiple of a number of qualifications associated with additional gaming devices in the secondary game.

45. An apparatus comprising:

one or more processors; and logic encoded in one or more tangible media for execution by the one or more processors and when executed operable to:

qualify a first gaming device to participate in a secondary type game upon playing a primary game;

trigger a secondary game indication cycle to run before the secondary type game is initiated, wherein said secondary game indication cycle is capable of running for a predetermined duration;

qualify, during said predetermined duration of said secondary game indication cycle, additional gaming devices to participate in the secondary type game;

upon conclusion of said secondary game indication cycle, initiate the secondary type game; and award, to every gaming device qualified to participate in the secondary type game, one or more payout awards.

46. The apparatus of claim 45, wherein after each additional gaming device is qualified, the logic is further operable to increase the secondary payout award by a designated multiple.

47. An apparatus comprising:

one or more processors; and logic encoded in one or more tangible media for execution by the one or more processors and when executed operable to:

provide a secondary game indication cycle indicative that a first gaming device has qualified for a secondary game;

qualify additional gaming devices to participate in the secondary game before expiration of said secondary game indication cycle; and initiate the secondary game and awarding a payout award to all qualified gaming devices including the first gaming device and the additional devices qualified to participate in the secondary game.

48. The apparatus of claim 47, wherein the logic is further operable to increase the payout award for each additional device that qualifies for the secondary game.

49. The apparatus of claim 47, wherein the logic is further operable to qualify the first gaming device additional times to participate in the secondary game during pendency of the secondary game indication cycle.

50. The apparatus of claim 47, wherein the secondary game indication cycle expires after a designated duration.

51. The apparatus of claim 47, wherein the secondary game indication cycle expires after a predetermined number of primary game plays after qualification of the first gaming device.

52. The apparatus of claim 47, wherein the secondary game indication cycle expires after a predetermined number of predetermined primary game outcomes after qualification of the first gaming device.

53. The method of claim 1, wherein increasing the payout award comprises increasing the payout award by a multiple of a number of qualifications associated with additional gaming devices in the secondary game.

* * * * *

US008162666C1

(12) EX PARTE REEXAMINATION CERTIFICATE (76th)
Ex Parte Reexamination Ordered under 35 U.S.C. 257

United States Patent

Parham

(10) Number: US 8,162,666 C1
(45) Certificate Issued: Jun. 27, 2017

(54) MULTI-PLAYER SECONDARY GAMING METHOD AND SYSTEM

(75) Inventor: Tyler Parham, Reno, NV (US)

(73) Assignee: Action Gaming, Inc.

Supplemental Examination Request:
No. 96/030,012, Jul. 18, 2014

Reexamination Certificate for:
Patent No.: 8,162,666
Issued: Apr. 24, 2012
Appl. No.: 10/712,628
Filed: Nov. 12, 2003

Related U.S. Application Data

(60) Provisional application No. 60/424,814, filed on Nov. 12, 2002.

(51) Int. Cl.
*G06F 19/00* (2011.01)
*A63F 13/00* (2014.01)
*G07F 17/32* (2006.01)
*A63F 9/24* (2006.01)

(52) U.S. Cl.
CPC ................ *A63F 9/24* (2013.01); *G07F 17/32* (2013.01); *G07F 17/3267* (2013.01)

(58) Field of Classification Search
None
See application file for complete search history.

(56) References Cited

To view the complete listing of prior art documents cited during the supplemental examination proceeding and the resulting reexamination proceeding for Control Number 96/030,012, please refer to the USPTO's public Patent Application Information Retrieval (PAIR) system under the Display References tab.

*Primary Examiner* — Peter C English

(57) ABSTRACT

In accordance with the present invention, multiple networked gaming devices can participate in a secondary type game. A primary game such as poker, rotatable wheels, wheel of fortune or the like is initiated on a gaming device. A predetermined outcome (for example) of the primary game is then used to qualify the gaming device for a secondary type game. A predetermined outcome might be a wheel of fortune SPIN symbol, for example. Once the gaming device is qualified, a secondary game indication cycle is triggered. During this cycle, additional gaming devices can then qualify for the secondary type game by using one or more predetermined primary game outcomes, for example. The secondary type game is then initiated and a secondary game payout awarded to the gaming devices.

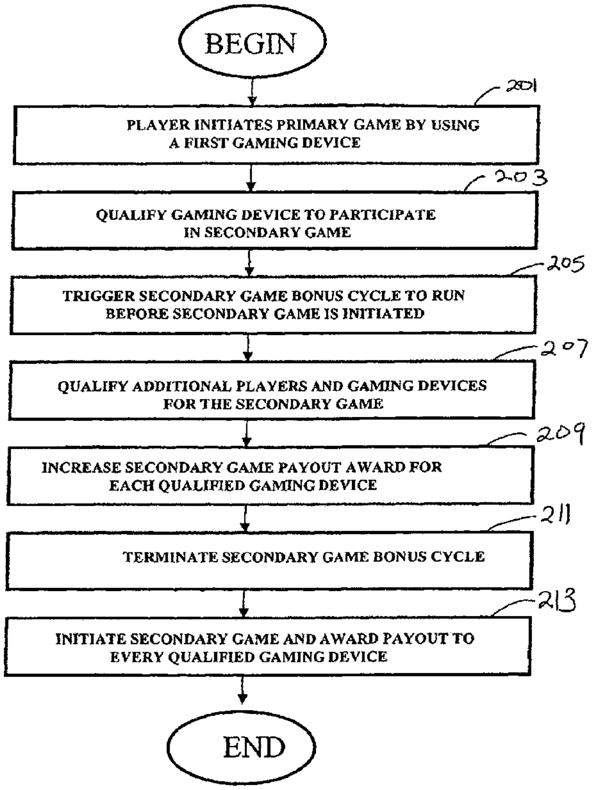

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-7, 10-17, 19-33, 35-50 and 53 are cancelled.

Claims 8, 9, 18, 34, 51 and 52 were not reexamined.

* * * * *